(12) United States Patent
Dulmovits, Jr. et al.

(10) Patent No.: US 7,345,629 B2
(45) Date of Patent: Mar. 18, 2008

(54) WIDEBAND ACTIVE PHASED ARRAY ANTENNA SYSTEM

(75) Inventors: John Michael Dulmovits, Jr., Sayville, NY (US); Ronald Joseph Bajit, Flushing, NY (US)

(73) Assignee: Northrop Grumman Corporation, Los Angeles, CA (US)

(*) Notice: Subject to any disclaimer, the term of this patent is extended or adjusted under 35 U.S.C. 154(b) by 4 days.

(21) Appl. No.: 11/358,240

(22) Filed: Feb. 21, 2006

(65) Prior Publication Data

US 2007/0194986 A1 Aug. 23, 2007

(51) Int. Cl.
*H01Q 3/00* (2006.01)
(52) U.S. Cl. ...................................... 342/372
(58) Field of Classification Search ........ 342/371–372, 342/377
See application file for complete search history.

(56) References Cited

U.S. PATENT DOCUMENTS

| | | | |
|---|---|---|---|
| 5,943,010 | A | 8/1999 | Rudish et al. |
| 6,252,535 | B1 | 6/2001 | Kober et al. |
| 6,529,166 | B2 | 3/2003 | Kanamaluru |
| 6,531,976 | B1 | 3/2003 | Yu |
| 6,549,151 | B1 | 4/2003 | Kober et al. |
| 6,598,014 | B1 | 7/2003 | Rabideau et al. |
| 6,693,580 | B1 | 2/2004 | Wehling |
| 6,778,137 | B2 | 8/2004 | Krikorian et al. |
| 6,778,138 | B2 | 8/2004 | Purdy et al. |
| 2002/0171583 | A1* | 11/2002 | Purdy et al. ............ 342/368 |
| 2004/0042439 | A1 | 3/2004 | Menon et al. |
| 2005/0024262 | A1 | 2/2005 | Cantrell et al. |
| 2005/0046607 | A1 | 3/2005 | Volman |
| 2006/0125687 | A1* | 6/2006 | Greeley ................. 342/368 |

OTHER PUBLICATIONS

J. G. Willms et al., "A Wideband GAAS 6-Bit True-Time Delay MMIC Employing On-Chip Digital Drivers", 4 pgs.
"True Time Delay Based Broadband Phased Antenna Array System", 5 pgs., http://tempest.das.ucdavis.edu/mmwave/NDL_PAA/NDL1.html.

* cited by examiner

*Primary Examiner*—Thomas H. Tarcza
*Assistant Examiner*—Fred H. Mull
(74) *Attorney, Agent, or Firm*—Robert P. Lenart, Esq.; Pietragallo Gordon Alfano Bosick & Raspanti, LLP

(57) ABSTRACT

A transmission system comprises a plurality of antenna elements; a plurality of power amplifiers, each of power amplifiers being connected to one of the antenna elements; a plurality of waveform/beam synthesizer assemblies, each of the waveform/beam synthesizer assemblies being connected to one of the power amplifiers; a processor for controlling modulation and beam forming/steering functions of the waveform/beam synthesizer assemblies; and a master clock for synchronizing operation of the processor and waveform/beam synthesizer assemblies, wherein each of the waveform/beam synthesizer assemblies generates a transmit element signal with embedded phase offset and amplitude adjustments in response to control signals from the processor, and each of the plurality of antenna elements radiates one of the transmit element signals. A method of producing one or more beams using an array of antenna elements is also provided.

17 Claims, 2 Drawing Sheets

WIDEBAND ACTIVE PHASED ARRAY ANTENNA SYSTEM

FIELD OF THE INVENTION

This invention relates to radio frequency (RF) transmission systems, and more particularly to such systems that include phased array antennas.

BACKGROUND OF THE INVENTION

Phased array antenna systems can provide rapid beam steering, the ability to generate simultaneous beams, dynamic adjustment of the characteristics of the beam pattern, and graceful degradation.

The underlying principle for beam steering in phased arrays is the alignment of the elemental signals in space such that they add constructively in a desired direction. A direct method of signal alignment would be to use time delay devices, but practical considerations often preclude their use. An often-used alternative is phase based beam steering, in which the elemental signals are appropriately phase shifted. Effectively, a phase gradient (or taper) is applied across the elements. For a given pointing angle, the value of the gradient depends on the signal frequency. Although the frequency dependence can usually be ignored for narrow-band applications, this is not true for wideband applications. Failure to compensate for the frequency dependence results in beam pointing errors or beam squint. In a phase based steering approach, timeliness of such compensation is the most important factor in beam pointing accuracy.

Phased array antennas can be used in transmit applications. Applications are progressively moving towards wideband operation. These modern systems may also require accurate, rapid, and dynamic beam forming and steering of modulated radio frequency (RF) signals. Beam forming and steering requirements may demand both sequential beam repositioning and simultaneous directionally independent multiple beams. The ultimate objective is to optimize the trade between own system effective isotropic radiated power (EIRP) and interference to other systems.

Beam forming (e.g., sidelobe control or beam spoiling) may be useful in optimizing intended performance. Beam forming is accomplished by applying a set of amplitude and/or phase weights across the array elements. The accuracy of these weights directly influences the quality of the resulting pattern. In cases where it is important to minimize emissions from the sidelobes (e.g., reducing interference), it is necessary to employ a mechanism for sidelobe control. This is accomplished by using amplitude weighting (i.e., taper) and/or phase adjustments across the elements. The control devices need sufficient resolution in order to achieve the desired beam shaping and level of sidelobe reduction. The quality of sidelobe reduction is directly related to the accuracy of the applied weight values and/or phase adjustments.

In cases where multiple beams are required, an option would be to generate time-multiplexed responses (i.e., sequentially steering to each direction, one at a time). It is imperative that the phase and amplitude control device speed be commensurate with the application. For example in airborne systems, because of the flight dynamics, the beam pointing will need adjustment to keep the beam properly positioned. Support of such beam control changes requires the ability to update the steering controls on the order of hundreds of milliseconds to seconds. For more demanding applications, steering changes may reach on the order of hundreds of nanoseconds. When dealing with multiple beams, another approach is to generate the beams simultaneously. Thus, the beam forming and steering architecture needs additional flexibility to control the individual elements.

Certain architectural implementations of phased array systems inherently possess critical disadvantages such as limited bandwidth, limited accuracy in shaping or pointing the beam, and reduction of effective isotropic radiated power (EIRP) due to inefficient multiple beam generation techniques.

An equation relating frequency (f) and pointing angle ($\theta$) for phase based steering systems is:

$$f_H \times \sin(\theta_H) = f_L \times \sin(\theta_L)$$

where $f_H$ represents the highest frequency of the bandwidth and $f_L$ is the lowest. Study of this equation reveals that the beam squint, $\theta_L - \theta_H$, increases with fractional bandwidth, $(f_H - f_L)/f_c$, where $f_c$ represents the center frequency of the bandwidth. Beam squint also increases as scan angle increases. In practice, the wideband limit of any particular architecture is driven by the amount of beam squint that is acceptable for a given application.

For various fractional bandwidths and scan angles, the squinted beam just enters nonvisible space. This leads to no radiation, which theoretically represents an infinite voltage standing wave ratio (VSWR) that will lead to total reflection of output power back into the power amplifier. This could lead to an amplifier damage condition. For the typical values of fractional bandwidth and scan angle encountered in certain applications, the problem of beam squint would be a common occurrence.

In summary, the use of a constant phase in a phase based steering approach is inadequate to steer a wideband signal. There is a need for a method that allows a more complete realization of the full potential of phased array transmit systems, while minimizing the drawbacks.

SUMMARY OF THE INVENTION

This invention provides a transmission system comprising a plurality of antenna elements; a plurality of power amplifiers, each of the power amplifiers being connected to one of the antenna elements; a plurality of waveform/beam synthesizer assemblies, each of the waveform/beam synthesizer assemblies being connected to one of the power amplifiers; a processor for controlling modulation and beam forming/steering functions of the waveform/beam synthesizer assemblies; and a master clock for synchronizing operation of the processor and waveform/beam synthesizer assemblies; wherein each of the waveform/beam synthesizer assemblies generates a transmit element signal with embedded phase offset and amplitude adjustments in response to control signals from the processor, and each of the plurality of antenna elements radiates one of the transmit element signals.

In another aspect, the invention provides a method of producing one or more beams using an array of antenna elements. The method comprises the steps of: using a plurality of waveform/beam synthesizer assemblies to generate a plurality of transmit element signals each having embedded phase offset and amplitude adjustments in response to control signals, amplifying the transmit element signals, and transmitting each of the transmit element signals using an antenna element in the array of antenna elements.

DETAILED DESCRIPTION OF THE INVENTION

Figure 1:
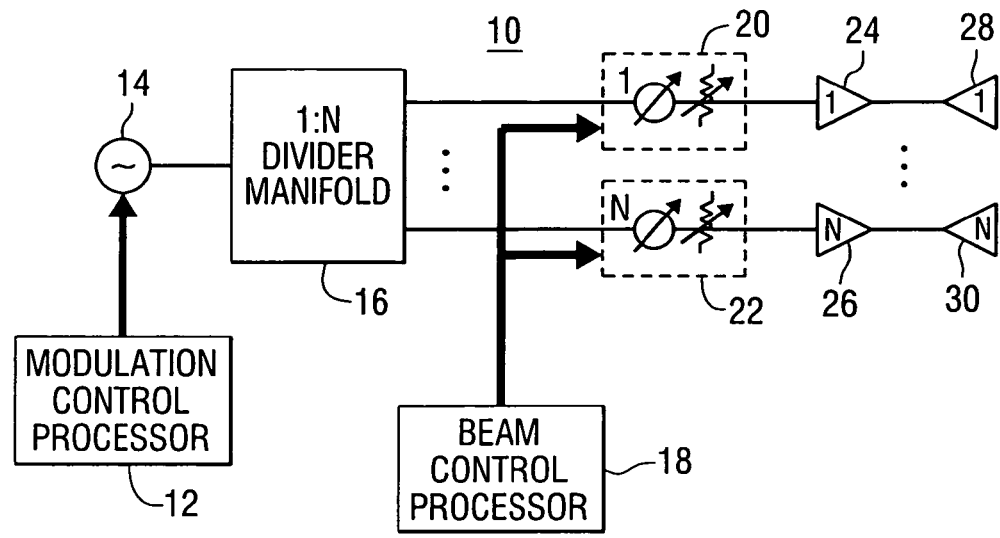
FIG. 1 is a block diagram of a prior art active phased array system architecture for single signal transmission.
Figure 2:
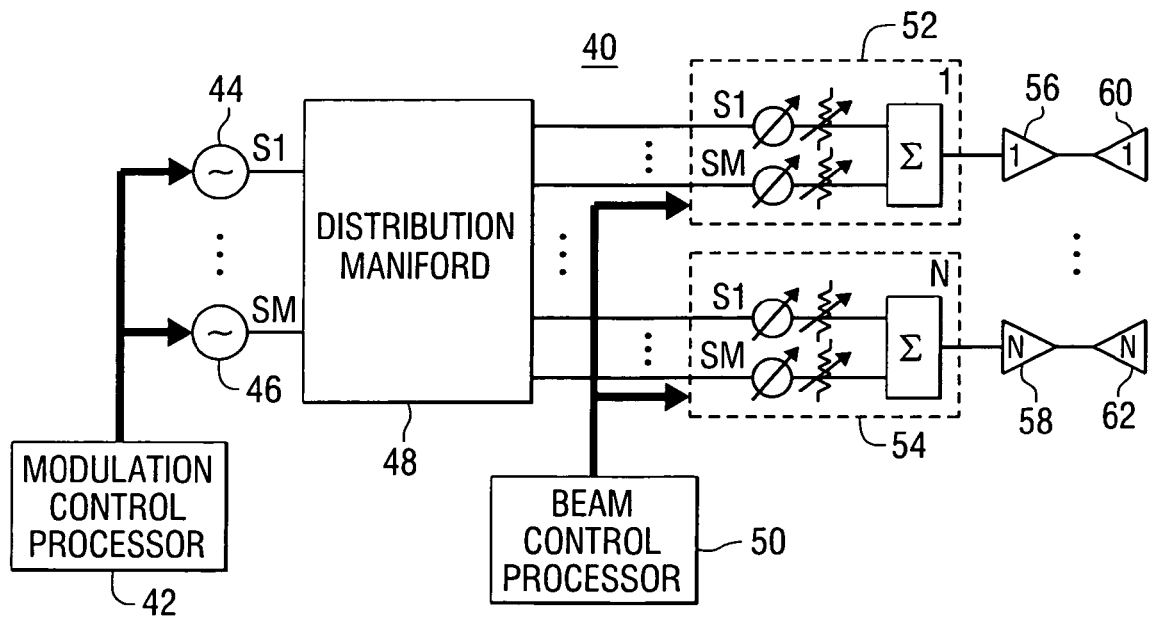
FIG. 2 is a block diagram of a prior art active phased array system architecture for simultaneous signal transmission.

Referring to the drawings, as a point of reference, prior art active phased array systems are illustrated in FIGS. 1 and 2. FIG. 1 illustrates an active phased array system 10 for single signal transmission including a modulation control processor 12, a signal generator 14, a manifold 16, a beam control processor 18, a plurality of time delay devices/attenuators 20 and 22, a plurality of power amplifiers 24 and 26, and a plurality of antenna radiating elements 28 and 30.

FIG. 2 illustrates an active phased array system 40 for simultaneous signal transmission including a modulation control processor 42, a plurality of signal generators 44 and 46, a manifold 48, a beam control processor 50, a plurality of time delay devices/attenuators/summer assemblies 52 and 54, a plurality of power amplifiers 56 and 58, and a plurality of antenna radiating elements 60 and 62.

For the architectures of FIGS. 1 and 2 to meet the requirement for wideband operation, time delay devices, rather than phase shifters, must be used for beam steering. Amplitude control devices are used for beam forming and sidelobe control. As used in this description, wideband operation means bandwidths exceeding approximately 50 MHz.

The use of a time delay gradient for beam steering is the ideal method. It is applicable for any signal because it exactly compensates for the wave delay phenomenon associated with the beam steering geometry. When using physical time delay devices, the important characteristics are the time resolution (which determines scan angle resolution), maximum delay (which determines maximum scan angle), and bandwidth limitations of any associated circuitry (which limits the usable signal bandwidth).

As an example, if the number of elements of the array (N) equals 123, the element spacing (d) equals 4.56 inches (11.58 mm), the minimum scan angle (or scan step) is $\theta_{min}$=1.234 degrees, and the maximum scan angle is $\theta_{max}$=56.78 degrees, then:

$L_{min}$=d sin($\theta_{min}$)=0.09820 inches (2.494 mm), where $L_{min}$ is the smallest incremental length of the transmission line used for the minimum time delay;

$T_{min}$=$L_{min}$/c=8.32 ps (in air or vacuum), where $T_{min}$ is the minimum time delay, and c is equal to the speed of light;

$L_{max}$=(N−1) d sin($\theta_{max}$)=465.4 inches (11.82 m), where $L_{max}$ is the largest total length of the transmission line used for the maximum time delay;

$T_{max}$=$L_{max}$/c=39.43 ns (in air or vacuum), where $T_{max}$ is the maximum time delay; and $N_T$ (total number of transmission lengths required to meet the scan parameters)=$L_{max}/L_{min}$=4740, if a binary (i.e., in powers of 2) switch matrix approach is used, is equivalent to 13 bits of delay resolution.

Based on this example, any attempt to implement this time delay resolution by digital means is presently not realizable. In particular, digital time delay approaches using direct digital synthesis (DDS) technology, as proposed in the prior art, are also not attainable.

Some recent developments on continuously variable delay lines are limited to a maximum delay on the order of hundreds of picoseconds. Thus, to implement time delay devices with a relatively long delay (as needed for large arrays with large scan angles), switching of transmission line segments may be the only viable approach. Coupled with a requirement for fine delay increments, such a device would potentially be very bulky, lossy, and costly. Also, when designing the delay device, care must be taken to minimize device dispersion, which will cause frequency dependent changes in the apparent length of the delay.

The amplitude control devices need sufficient resolution in order to achieve the desired beam shaping and level of sidelobe reduction requirements. To meet a requirement for simultaneous beams, an independent set of time delay and amplitude control devices must be provided. This is reflected in the prior art system of FIG. 2.

In addition to satisfying applications that require simultaneous directionally independent beams, the traditional active array architecture might also be required to support time-multiplexing of directionally independent beams. If individual beam time delay and amplitude control devices were not provided, then switching would have to be fast enough to support the multiplex process (dwells on the order of hundreds of nanoseconds with transition times on the order of tens of nanoseconds). This capability is not realizable.

The key architectural implementation discriminators and their associated impact considerations indicate that careful attention needs to be paid to the architectural requirements and the technology that ultimately populates the system to guarantee that desired overall performance is obtained.

Figure 3:
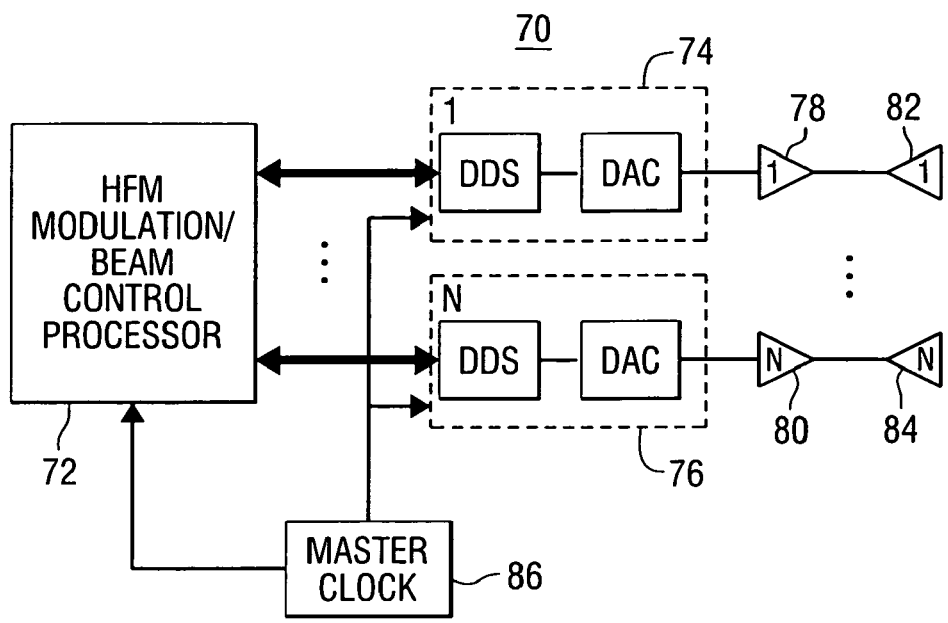
FIG. 3 is a block diagram of an active phased array system architecture for single signal transmission in accordance with one embodiment of the invention.

FIG. 3 illustrates a single signal transmission system 70 constructed in accordance with one embodiment of the present invention. The system 70 comprises a high fidelity method (HFM) modulation/beam control processor 72, a plurality of waveform/beam synthesizer assemblies 74 and 76 (each including a direct digital synthesizer (DDS) and a digital-to-analog converter (DAC)), a plurality of power amplifiers 78 and 80, a plurality of antenna radiating elements 82 and 84, and a master clock 86.

Figure 4:
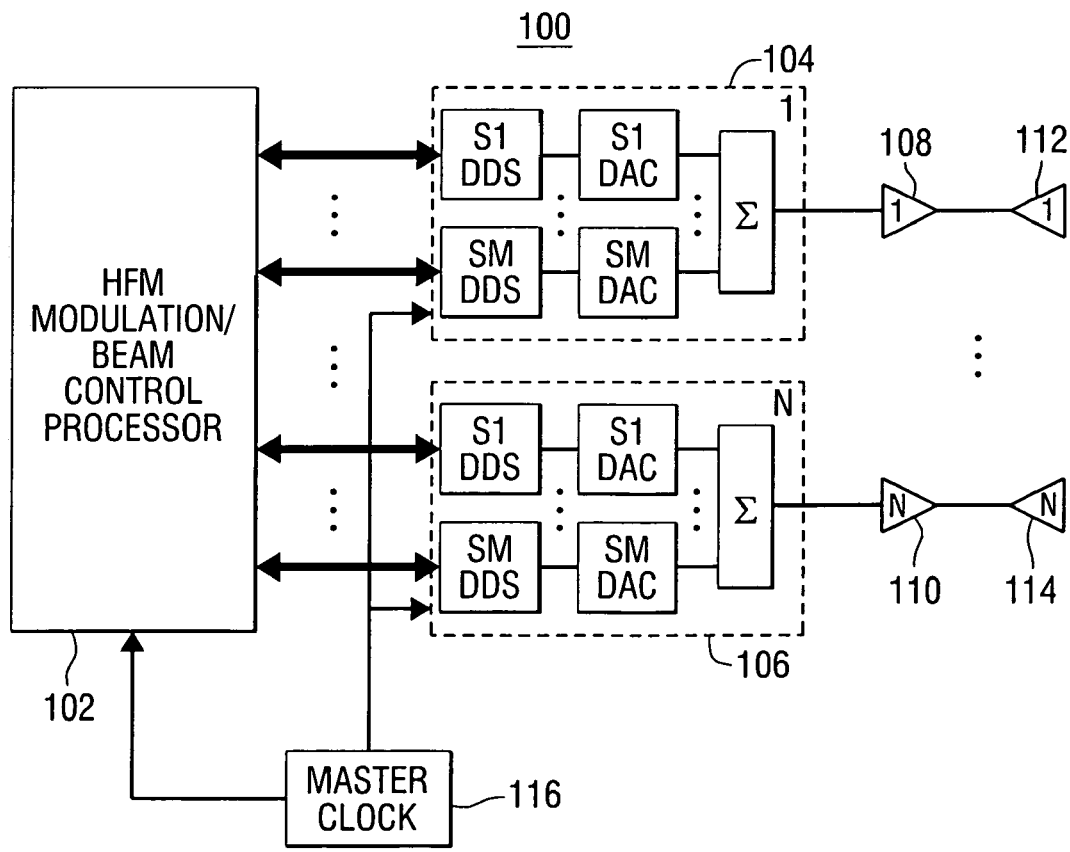
FIG. 4 is a block diagram of an active phased array system architecture for simultaneous signal transmission in accordance with another embodiment of the invention.

FIG. 4 illustrates a simultaneous signal transmission system 100 constructed in accordance with another embodiment of the present HFM invention. The system 100 comprises a HFM modulation/beam control processor 102, a plurality of waveform/beam synthesizer assemblies 104 and 106 (each including a plurality of direct digital synthesizers (DDSs), a plurality of digital-to-analog converters (DACs), and a summing circuit), a plurality of power amplifiers 108 and 110, a plurality of antenna radiating elements 112 and 114, and a master clock 116.

This invention provides a high fidelity method (HFM) to allow signal modulation and beam forming/steering parameters to be combined during the digital generation of the signal itself for transmission through the individual antenna elements of a wideband active phased array transmission system. Architecture bandwidth is only limited by the bandwidth of the narrowest bandwidth device that is used in the system. The HFM invention has no inherent bandwidth limitation and therefore maintains its relevance even as future device technology bandwidth increases. Since the HFM invention only relies on phase to steer the beam position, the number of phase bits of resolution used in the implementation would be the only concern relative to beam squint effects. Beam squint, in the practical sense, is not an issue for the HFM due to presently achievable phase resolution (i.e., one-thousandths of a degree or better).

The HFM modulation/beam control processor contains all of the necessary algorithms to allow dynamic modification of signal modulation and beam forming/steering taper values for each antenna element of the array. The composite radio frequency (RF) transmit element signals are generated in a plurality of waveform/beam synthesizer assemblies using DDS technology, and fed directly to the power amplification devices and the associated array antenna element for transmission.

The HFM approach affords the necessary capability and offers flexibility not currently available from any known architecture or method in the current state of the art. FIGS. 3 and 4 illustrate active array architectures using the HFM. An important difference between the prior art systems and the HFM active array approaches is the need for a waveform/beam synthesizer assembly for each element and the elimination of all devices between the assembly and power amplifier. In addition to modulation generation control, the HFM modulation/beam control processor in the HFM architecture includes the necessary digital processing to control the beam forming and steering functions of the waveform/beam synthesizer assemblies. This is in contrast to prior art architectures that use a separate beam control processor to manage the beam via discrete devices. In the preferred embodiment, the architectural implementation is accomplished through the use of direct digital synthesis (DDS) based technology.

Available off-the-shelf DDS devices typically include the ability to perform phase offset and amplitude adjustment but do not provide the ability to dynamically meet the stringent temporal requirements of most non-commercial applications due primarily to the limitations in the speed of the data interface (typically a serial bus interface).

Based on a survey of available field programmable gate array (FPGA) and digital-to-analog converter (DAC) technologies, it is apparent that the clocking speeds and the flexibility of high speed parallel interface options available will allow the synthesis (that is, a custom design) of a DDS based architecture that will meet or exceed all the requirements necessary for generating simultaneous directionally independent beams and time-multiplexing of directionally independent beams.

The ability to physically realize the HFM DDS based architecture in other higher order integration technologies is also possible. For example, if the quantity of a given production is favorable, then an application specific integrated circuit (ASIC) may prove to be economical and beneficial. It is also possible that a multi-chip module (MCM) combination of FPGAs and ASICs may be chosen as the implementation. The invention implementation may take other forms by advances in system-on-chip (SOC) technologies.

A major advantage of the HFM approach is that all temporal, spectral, and spatial control for the architecture is managed by the HFM modulation/beam control processor and associated algorithms, and the functionality is embodied within the HFM waveform/beam synthesizer assembly(ies). The master clock provides coherent synchronization of signal modulation and beam forming/steering.

In another aspect, the invention provides a method of producing one or more beams using an array of antenna elements. The method comprises the steps of: using a plurality of waveform/beam synthesizer assemblies to generate a plurality of transmit element signals, each having embedded phase offset and amplitude adjustments in response to control signals, amplifying the transmit element signals, and transmitting each of the transmit element signals using an antenna element in the array of antenna elements.

The signal modulation and beam forming/steering are coherently synchronized. The antenna elements can be positioned in a non-planar array. Independently modulated simultaneous signals can be generated on associated directionally independent beams. A wideband signal can be generated by continuously updating a phase steering command as the transmit element signals are generated.

A significant advantage of the HFM approach is that it facilitates an open architecture implementation. The HFM eliminates the need for phase shifters, true time delay devices, digitally controlled attenuators (DCAs) or any other devices traditionally used to produce phase and amplitude modification to the output signal to form the required antenna beam or multiple antenna beams. Therefore, the HFM facilitates the development of an "element building block" that can be scaled up or down to adapt to any transmit application. This "element building block" would include the waveform/beam synthesizer assembly(ies), the power amplifier(s), and the antenna elements. The array would include a number of these building blocks as the application dictates. Having all element control combined in one device allows a look-up table to be added to the processor, upon build up, to compensate for element unique amplitude and phase changes as a function of frequency and temperature.

The DDS includes the phase offset and amplitude adjustment. Normally these functions are used to support modulation generation. For the HFM application, these functions will also be used to form and steer a beam(s), and possibly to generate pattern null(s).

The unique features of the HFM concept include the expanded use of the phase offset and amplitude adjust functions of the DDS. By supplying beam steering controls to the DDS phase offset inputs, the benefits of significantly higher resolution (tens of bits) and higher speed relative to traditional phase shifter devices are obtained. Because of the speed and resolution available for phase control, the circuit provides more than just the digital equivalent of a phase shifter. It is possible to mimic the phase characteristic of a time delay device. This characteristic exhibits a frequency dependence of the form $$\phi_c(t) = f(t) \times t_d,$$

where $\phi_c(t)$ is the instantaneous phase correction, f(t) is the instantaneous signal frequency, and $t_d$ is the value of time delay that is sought. Basically, if the phase can be adjusted in accordance with this prescribed frequency dependence, an equivalent to a true time delay can be achieved.

This invention adaptively adjusts a transmit pattern by controlling each antenna element. The HFM approach mitigates beam pointing and beam width issues associated with passing wideband signals through a phased array antenna. HFM avoids the distortion issue by providing each signal with its own power amplifier. The signal waveforms are generated prior to the power amplification stage. Phase steering information is embedded within the signal modulation using DDS technology. HFM steers a wideband signal by continuously updating the phase steering command as the signal is generated, in order to avoid unintended beam squint due to frequency.

A noteworthy advantage of the HFM approach is the potential to provide greater fidelity than conventional approaches to negate the effects on array performance caused by contouring the array to varied complex shapes. As an example, if it was determined that the best installation for a particular airborne platform was to install the array in a newly designed pod, which has the same lines as a fuel tank that it would replace, the benefits would be two-fold.

Firstly, placing the array's antenna elements in a non-planar array (for example, directly against the radome) while maintaining antenna element-to-element spacing and avoiding antenna element rotation (i.e., stepping the element along the contour while maintaining the orientation of the individual antenna element in the XY-plane as it would be if configured in a linear or planar array) results in identical aeronautical performance (from a surface contour perspective) as the fuel tank, and results in a significant reduction in aeronautical impact when compared to a traditionally flat surface required by conventional array approaches.

Secondly, it seems reasonable that the impact to array performance could be minimized due to the high fidelity of the HFM approach. Both benefits are afforded through the HFM's use of high precision digital phase and amplitude fidelity.

Today's digital technology provides support for the practicality of realizing the HFM capability. Frequency-invariant (i.e., constant phase) devices cannot be used to control beam steering. To achieve the objectives of this invention, candidate transmission system architectures require an adequate number of phase and amplitude control bits of quantization. The technologies can support directionally independent time-multiplexed beams, simultaneous beams, or the amalgamation of both.

This invention provides a High Fidelity Method (HFM) to allow signal modulation and beam forming/steering parameters to be synchronously and coherently combined during the digital generation of the signal itself for use in wideband active phased array transmit system applications. HFM adaptively controls the modulation and beam parameters (frequency, delta frequency, amplitude, and phase) of the signal or signals (in the case of multiple transmissions) using either off-the-shelf direct digital synthesizer (DDS) and digital-to-analog converter (DAC) devices, or user designed custom devices. HFM requires adjustment of amplitude and phase offset, but does not require time delay processing, to produce the desired beam or beams. For single signal transmission, a DDS/DAC would be required at each antenna element of the array with a HFM modulation/beam control processor providing real-time control of the parameters. For multiple signals to be transmitted simultaneously, a DDS/DAC would have to be provided for each signal and a number of devices would be replicated at each element.

While the invention has been described in terms of several embodiments, it will be apparent to those skilled in the art that various changes can be made to the described embodiments without departing from the scope of the invention as set forth in the following claims.

What is claimed is:

1. A transmission system comprising:
   a plurality of antenna elements;
   a plurality of power amplifiers, each of the power amplifiers being connected to one of the antenna elements;
   a plurality of waveform/beam synthesizer assemblies, each of the waveform/beam synthesizer assemblies being connected to one of the power amplifiers;
   a processor for controlling modulation and beam forming/steering functions of the waveform/beam synthesizer assemblies; and
   a master clock for synchronizing operation of the processor and waveform/beam synthesizer assemblies;
   wherein each of the waveform/beam synthesizer assemblies generates a wideband transmit element signal with embedded phase offset and amplitude adjustments, using frequency, delta frequency, amplitude and phase parameters in response to control signals from the processor without time delay processing, and each of the plurality of antenna elements radiates one of the transmit element signals.

2. The transmission system of claim 1, wherein each of the waveform/beam synthesizer assemblies includes:
   a direct digital synthesizer coupled to a digital-to-analog converter.

3. The transmission system of claim 1, wherein each of the waveform/beam synthesizer assemblies includes:
   a plurality of direct synthesizers, each coupled to a digital-to-analog converter.

4. The transmission system of claim 3, wherein each of the waveform/beam synthesizer assemblies further includes:
   a summing circuit for summing signals from the digital-to-analog converters.

5. The transmission system of claim 1, wherein the master clock provides coherent synchronization of signal modulation and beam forming/steering.

6. The transmission system of claim 1, wherein the antenna elements are positioned in a non-planar array.

7. The transmission system of claim 1, wherein the processor includes:
   a look-up table for compensating for radiating element amplitude and phase changes as a function of frequency and temperature.

8. A method of producing one or more beams using an array of antenna elements, the method comprising the steps of:
   using a plurality of waveform/beam synthesizer assemblies to generate a plurality of wideband transmit element signals each having embedded phase offset and amplitude adjustments, using frequency, delta frequency, amplitude and phase parameters responsive to control signals without time delay processing;
   amplifying the transmit element signals; and
   transmitting each of the transmit element signals using an antenna element in the array of antenna elements.

9. The method of claim 8, further comprising the step of:
   synchronizing operation of the waveform/beam synthesizer assemblies.

10. The method of claim 8, wherein each of the waveform/beam synthesizer assemblies includes:
    a direct digital synthesizer coupled to a digital-to-analog converter.

11. The method of claim 8, wherein each of the waveform/beam synthesizer assemblies includes:
    a plurality of direct digital synthesizers, each coupled to a digital-to-analog converter.

12. The method of claim 11, wherein each of the waveform/beam synthesizer assemblies further includes:
    a summing circuit for summing signals from the digital-to-analog converters.

13. The method of claim 8, further comprising the step of:
    providing coherent synchronization of signal modulation and beam forming/steering.

14. The method of claim 8, wherein the antenna elements are positioned in a non-planar array.

15. The method of claim 8, further comprising the step of:
    generating independently modulated simultaneous signals on associated directionally independent beams.

16. The method of claim 8, wherein the control signals provide phase steering commands.

17. The method of claim 8, further comprising the step of:
    steering a wideband signal by continuously updating a phase steering command as the transmit element signals are generated.

* * * * *

UNITED STATES PATENT AND TRADEMARK OFFICE
CERTIFICATE OF CORRECTION

| | | |
|---|---|---|
| PATENT NO. | : 7,345,629 B2 | Page 1 of 1 |
| APPLICATION NO. | : 11/358240 | |
| DATED | : March 18, 2008 | |
| INVENTOR(S) | : John Michael Dulmovits, Jr. and Ronald Joseph Bajit | |

It is certified that error appears in the above-identified patent and that said Letters Patent is hereby corrected as shown below:

Claim 3
Column 8, Line 5 Should read
The transmission system of claim 1, wherein each of the waveform/beam synthesizer assemblies includes: a plurality of direct -- digital -- synthesizers, each coupled to a digital-to-analog converter.

Signed and Sealed this

Seventeenth Day of March, 2009

JOHN DOLL
*Acting Director of the United States Patent and Trademark Office*